May 1, 1956
D. J. BALCHEN
2,744,041
ADHESIVE SHEETING
Filed June 6, 1955
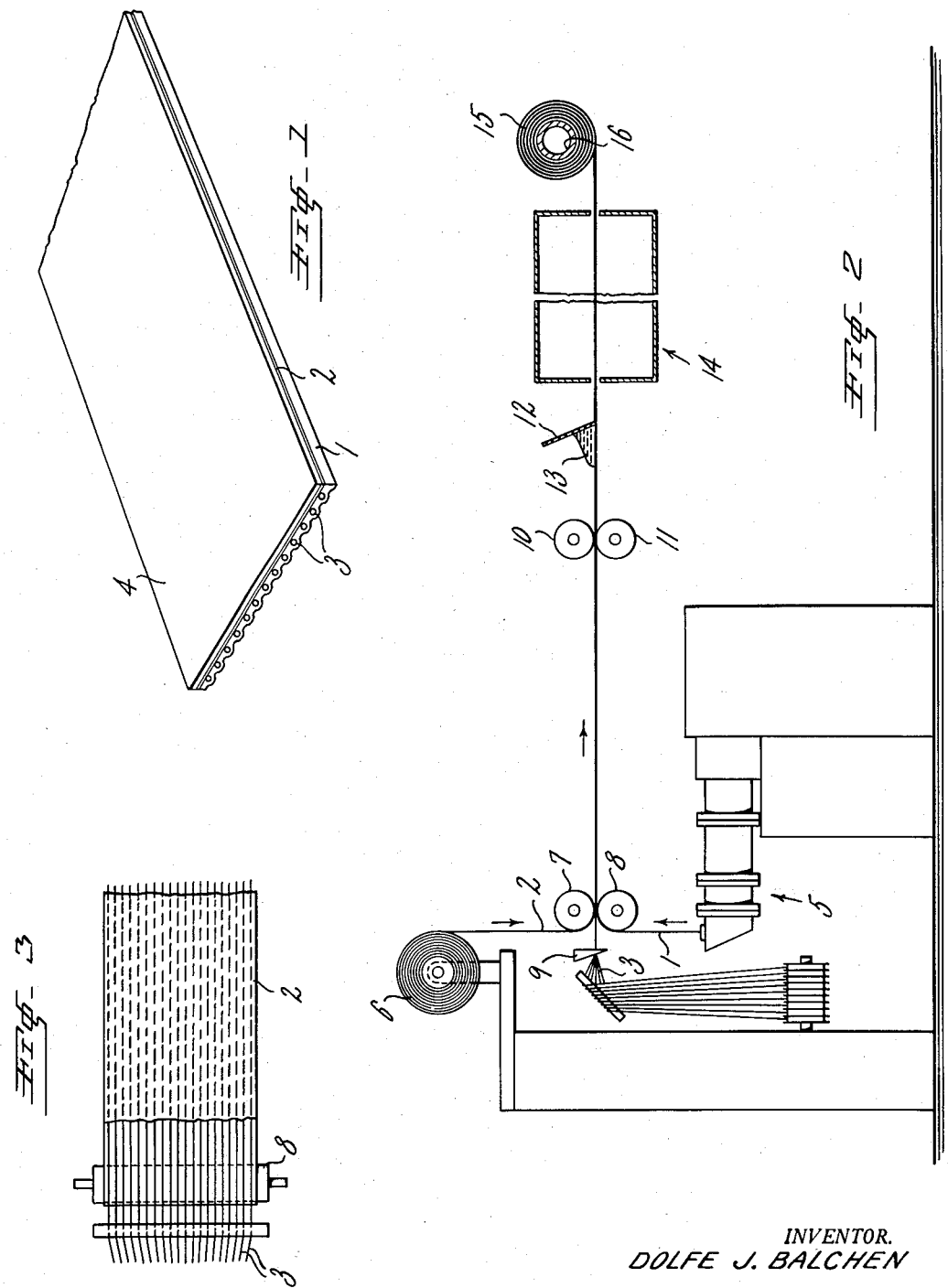
INVENTOR.
DOLFE J. BALCHEN
BY
Robert J. Patterson
ATTORNEY

United States Patent Office 2,744,041
Patented May 1, 1956

2,744,041

ADHESIVE SHEETING

Dolfe J. Balchen, Paterson, N. J., assignor to United States Rubber Company, New York, N. Y., a corporation of New Jersey Application June 6, 1955, Serial No. 513,386

3 Claims. (Cl. 154—53.5)

This invention relates to pressure-sensitive adhesive sheeting, especially in the form of tape, and more particularly to tape used for packaging purposes, i. e., so-called "strapping" tape which is used in place of twine, cord, metal strapping, or the like. Still more particularly, the invention relates to such tape which is capable of being wound upon itself in roll form and unwound therefrom without delamination or offsetting of the adhesive and which offers substantial improvements, particularly with respect to resistance to water, humidity, weathering, cost, etc., as compared with strapping tapes currently available.

The adhesive sheet of my invention comprises a water-insoluble normally tacky and pressure-sensitive adhesive of the rubber-resin type manifested as a layer upon a backing element composed of a sheet of paper and a film of polyethylene fusion-bonded to the sheet of paper, this backing element being reinforced with a plurality of spaced parallel glass fiber yarns interposed between the paper and the polyethylene film and embedded in the polyethylene of the film. In the case of a tape, which is the form my invention usually takes, these glass fiber yarns are disposed parallel to the edges of the tape so as to give the desired longitudinal reinforcement.

In the accompanying drawings:

Fig. 1 is a perspective view on a greatly enlarged scale of a section of tape made according to my invention;

Fig. 2 is a diagrammatic side elevation of one arrangement of equipment for making adhesive sheeting embodying my invention; and Fig. 3 is a diagrammatic plan view, partly cut away, of that portion of the equipment wherein the glass fiber yarns are embedded in the polyethylene film and sealed in position during the fusion bonding of a freshly extruded film of polyethylene to the sheet of paper.

In accordance with my invention, a layer of water-insoluble normally tacky and pressure-sensitive adhesive of the so-called rubber-resin type (for more complete information regarding the well-known "rubber-resin" pressure-sensitive adhesives, see U. S. Patents 2,177,627; 2,674,556 and Reissue 23,843) is applied to the paper face of a composite backing element made up of a sheet of paper, a plurality of spaced parallel glass fiber yarns on the surface of the paper opposite to the side carrying the adhesive layer, and a film of polyethylene fusion-bonded directly to the yarns and to the surface of the paper between the yarns. In the case of a tape, these yarns are disposed parallel to the edges of the tape. Each of the yarns is completely surrounded by polyethylene contained in the film with the exception, of course, of that small portion of the yarns which is in direct contact with the paper.

The backing element used in accordance with my invention can be made by extruding a film of polyethylene and fusion-bonding this film to a sheet of paper, the glass fiber yarns in parallel being introduced between the polyethylene film and the sheet of paper just prior to the fusion-bonding step. Typically, the extruded polyethylene film and the sheet of paper are pressed together under fusion-bonding conditions almost immediately after the polyethylene film emerges from the extruder head so that this film is still at an elevated temperature. The parallel glass fiber yarns are inserted between the polyethylene film and the sheet of paper at the point of fusion-bonding which preferably is accomplished by pressure rollers in a manner which will be completely obvious to those skilled in the art from Figs. 2 and 3 of the accompanying drawings and from this specification. As a result, the polyethylene is caused to almost completely surround the glass fiber yarns and to be fusion-bonded directly to the surface of the paper between the yarns and at the sides of the web which constitutes the backing element of my adhesive sheeting. During the fusion bonding of the polyethylene film to the sheet of paper, the polyethylene is forced into the minute interstices of the yarns so that a strong bond between the yarns and the surrounding polyethylene is obtained. Thus, the interposition of any adhesive between the yarns and the polyethylene and between the polyethylene and the paper, with the attendant complication and expense, is obviated. In addition, there is no necessity of using a solvent for the polyethylene in order to achieve good bonding thereof to the yarns and the paper. An extremely good bond is obtained simply by the fusion and pressure in the nip of the rolls between which the freshly extruded polyethylene film and the sheet of paper with the parallel glass fiber yarns therebetween are continuously passed.

It will be understood by those skilled in the art that the polyethylene film at the point of fusion-bonding is at an elevated temperature such that by the action of the pressure of the rollers the polyethylene is fused and caused to cover the yarns and the paper in such manner as to form a composite material which when cooled to moderate temperature, say from room temperature to 150° F., has its component parts tenaciously bonded together into a unified structure which is provided with a layer of the pressure-sensitive adhesive.

After the composite polyethylene-glass yarn-paper web material has cooled to a suitably low temperature, say below 150° F., it is coated, as by a spreading machine of known type, on the exposed face of the paper layer with a rubber-resin type pressure-sensitive adhesive. The coated web is then passed through a drying oven to remove the bulk of the volatile organic solvent contained in the adhesive layer. It is then rolled up on a cardboard core. The resulting roll is then slit in the known manner into rolls of tape of the desired widths for the general trade.

The number of glass fiber yarns per inch of width of the tape can vary quite widely depending upon the strength desired in the tape. Typically the number of yarns per inch of width of tape will be equal to from 10 to 70.

The size of the glass fiber yarns can likewise vary widely. Yarns of small diameter are preferred in the interest of smooth appearance, flexibility and overall thinness. Yarns known in the trade as size 150–1/0 have given outstanding results. For the standard system of designating glass yarns see ASTM D578–52 (pages 402–405 of "ASTM Standards on Textile Materials," November 1953).

The glass fiber yarn-reinformed composite polyethylene-paper web used as the backing element of my tape can vary quite widely in thickness. Typically it will have an overall thickness of about 0.005". The overall thickness may be as low as 0.003" or as great as 0.012", depending upon the particular application. Typically the thickness of the paper will be equal to from 0.002" to 0.010" while the polyethylene film bonded thereto will typically range in thickness from 0.001" to 0.005".

The thickness of the adhesive layer will usually be less than that of the backing element. Typically it will range from 0.001" to 0.003". The total thickness of the tape will typically range from 0.004" to 0.015". I especially prefer that the adhesive sheet of my invention have an overall thickness not over 0.007".

A highly desirable advantage of the use of the composite backing element described herein is the fact that the adhesive layer adheres to the paper so strongly that there is no offsetting or transfer of the adhesive layer during unwinding of the rolled-up sheet or tape of my invention. Commercially acceptable products are obtained when the adhesive layer is applied directly to the surface of the paper. However, if desired, a primer coat of any known type can be interposed between the adhesive layer and the paper to still further enhance the bonding of the adhesive to the paper. In the appended claims, where reference is made to the adhesive layer on a surface of the paper it is to be understood that both direct deposition of the adhesive layer on the paper as well as anchorage thereof to the paper through the intermediary of a primer are contemplated.

To the best of my knowledge no one has ever provided a pressure-sensitive adhesive tape having a construction like my tape or offering the unusual combination of properties and advantages possessed by my tape.

Referring now to the drawings, and first to Fig. 1, reference numeral 1 denotes the polyethylene film of the backing element, this film being fusion-bonded to paper sheet 2, the composite web being reinforced by the longitudinal glass fiber yarns 3 which are almost completely surrounded by and to some extent are impregnated by the polyethylene of film 1. Film 1 is secured directly to paper sheet 2 and likewise to yarns 3 without the interposition of any extraneous material. Substantially no air is entrained between the film 1 and sheet 2 because of the fact that air is squeezed out at the nip of the rollers in the fusion-bonding step presently to be described. This freedom from entrapped air gives better bonding of the paper and glass fiber yarns to the polyethylene.

Reference numeral 4 denotes the layer of pressure-sensitive adhesive on the side of paper sheet 3 opposite film 1.

It will be understood that Fig. 1 is purely diagrammatic and that the relative thicknesses of the several layers portrayed therein are not necessarily used in practice.

Referring now to Figs. 2 and 3, a film of polyethylene 1 is extruded by extruder 5. Film 1 and a sheet of paper 2 from roll 6 are fusion-bonded together while the film 1 is still hot by the action of cooperating pressure rolls 7 and 8. Roll 8 is preferably resiliently surfaced so as to push the polyethylene firmly around yarns 3 while avoiding undesirable flattening or other damage to yarns 3. Parallel glass fiber yarns 3 are continuously fed into the nip of film 1 and sheet 2, yarns 3 being spaced by a comb 9. After traveling a substantial distance after emerging from the nip of rolls 7 and 8, in order to permit air-cooling to a suitably low temperature, the backing element is ready to be coated with the adhesive. The cooling can take place between rolls 7 and 8 and guide rolls 10 and 11. The cooled backing element can be rolled up at this point and coated at any later time. Alternatively, it can be coated in an immediately following operation as shown.

In Fig. 2 of the drawings, the backing element is shown as being coated by the action of doctor knife 12 behind which a bank 13 of adhesive is maintained. The coated backing then passes through a drying zone 14 of any convenient type designed to remove nearly or substantially all of the volatile solvent contained in the adhesive layer. The dried laminate is then wound up into a roll 15 which can have the conventional cardboard core 16. The material in roll 15 will usually be of a width considerably wider than that of the desired tape, often of a width ranging from 10 to 44 inches. This roll can be slit into rolls of finished tape of any desired width.

The composition of the rubber-resin type adhesive which forms layer 4 constitutes no part of my invention. I can use any of the known "rubber-resin type" pressure-sensitive adhesives such as are described in the three patents cited above. These adhesives are usually based upon a mixture of a natural or a synthetic rubbery material (such as natural rubber, GR–S, rubbery polyisobutylene, e. g. the material known as "Vistanex," reclaimed natural or synethetic rubber, etc.) and a natural or synthetic tackifying resin. The selection of operable rubbery materials and tackifying resins is well within the skill of the art.

It will be understood that the term "rubber-resin type adhesive" denotes not only adhesives which are based upon a blend of a rubbery material and a resin but also adhesives having the physical properties of rubber-resin adhesives such as adhesives based upon vinyl alkyl ether polymers or upon copolymers of two or more monomeric alkyl acrylates. In this connection, the disclosures of the three patents cited above with respect to the rubber-resin type adhesive are hereby expressly incorporated herein by reference.

It will be understood that the various elements of my adhesive sheet or tape can be colored or not as desired. For example, the paper layer or the polyethylene layer or both may be colored if desired to achieve various novel color effects having a strong customer appeal.

My adhesive sheet or tape can be rolled up without the interposition of any separating or blocking material and can be unrolled without any transfer of adhesive to the uncoated face. This result is achieved because the polyethylene film which forms the uncoated surface which is in contact with the adhesive layer when the finished material is in roll form acts as a release or parting surface.

*Example*

A glass fiber-reinforced polyethylene-paper laminate was made by introducing glass fiber yarns of the type known in the textile industry as size 150–1/0 between a layer of flat kraft paper 0.002" thick and a layer of freshly extruded polyethylene film 0.002" thick as the polyethylene film is fusion-bonded to the paper in the manner described above and portrayed in the drawings. The resulting laminate had an overall thickness of approximately 0.005". This backing element, which contained 16 of the aforementioned yarns per inch of width and which was 10 inches wide, was allowed to cool to approximately room temperature after its formation. The paper face of this laminate was thereafter coated with a layer approximately 0.002" thick of pressure-sensitive adhesive material having the following formulation:

Polyisobutylene ("Vistanex B-100," Molecular weight 100,000)_____pounds__ 40
Polyisobutylene ("Vistac," molecular weight 1,100 pounds__ 15
Ethylene glycol ester of hydrogenated resin ("Staybelite Ester No. 1")_____pounds__ 20
Factice (Vulcanized vegetable oil) ("Amberex B")_____pounds__ 1.5
Volatile petroleum solvent_____gallons__ 25

After drying, the resulting tape was rolled up on a cardboard core into a roll which was thereafter slit into rolls of tape of the desired width.

The resulting tape was used for sealing and reinforcing cardboard shipping cartons, in place of conventional "strapping tape" of the prior art, with very good results.

Although the polyethylene portion of the backing element of my tape would be highly stretchable if unreinforced and although the paper portion thereof would not have adequate tensile strength if unreinforced, the longitudinally disposed glass fiber yarns, being substantially inextensible, substantially prevent longitudinal stretching of my tape. Thus, in a one inch width, my tape shows a longitudinal extensibility ranging from zero to not over 3% when pulled with a force equivalent to that of ordinary hand-pulling. Yarns made from other fibers, such as nylon, cotton or rayon, would not give this result. In addition, the glass fiber yarns are considerably less costly than yarns of other fibers, for equal strength.

The paper layer 2 of my sheet or tape can be made from any suitable kind of paper. Examples are kraft paper and a thin light weight paper known to the trade as "Tuscan" paper. It is preferable to use thin grades of paper, i. e. paper not thicker than about 0.003" in the practice of my invention in order that the overall thickness of the finished pressure-sensitive sheeting or tape may be as small as possible so as to avoid undue protrusion from the surface of the package. I prefer to use flat paper in practicing my invention.

From the foregoing description, many advantages of my invention will be apparent to those skilled in the art. A particular advantage is that the glass yarns, being firmly embedded in the polyethylene of the composite backing web, will not strip from the web when the tape is handled and used. This is a great advantage over existing types of paper and other available strapping tapes wherein the longitudinal reinforcing yarns show an undesirable tendency to separate from the web during handling and use. Another advantage of the tape of my invention is that it is economical to manufacture. Another advantage is that the backing element of my tape is completely resistant to water, moisture vapor, weather, chemicals, and other elements which have an adverse effect upon conventional strapping tapes such as the paper-backed and cellulose acetate-backed strapping tapes currently available. Still another advantage is that no solvent or adhesive is used to effect adhesion between the polyethylene and the reinforcing yarns and the paper. An exceedingly high degree of adhesion is obtained as a result of the forcing of the hot polyethylene around the yarns and into contact with the paper layer during the formation of the composite backing material. In marked contrast, adhesives are used to bond the reinforcing yarns to the paper or cellulose acetate film used as backing element in all currently available reinforced strapping tapes with which I am familiar. Another advantage of my tape is its good flexibility compared to current strapping tapes made with a rayon yarn-reinforced cellulose acetate backing element or with glass fiber yarn-reinforced paper as the backing element. As a result, my tape is easily conformed to the surface upon which it is used. It is quite free from springiness, stiffness, boardiness or the like so that it does not objectionably loosen from the surface to which it is applied. Another advantage is that my construction lends itself to the manufacture of tapes of extreme thinness coupled with high strength. Thus by my invention excellent tapes having an overall thickness not over 0.007" can easily be made. Such tapes because of their extreme thinness are highly desirable since they do not project so far from the package strapped therewith and therefore are much less susceptible to loosening by scuffing and similar influences as compared with the much thicker strapping tapes now on the market. Numerous other advantages of the construction of my invention will be apparent to those skilled in the art.

Having thus described my invention, what I claim and desire to protect by Letters Patent is:

1. A pressure-sensitive adhesive sheet comprising a backing element composed of a sheet of paper, a plurality of spaced parallel glass fiber yarns on one surface of said paper, and a film of polyethylene fusion-bonded directly to said yarns and to the surface of said paper between said yarns, and water-insoluble normally tacky and pressure-sensitive adhesive of the rubber-resin type on the other surface of said paper.

2. A pressure-sensitive adhesive tape comprising a backing element composed of a sheet of paper, a plurality of longitudinally extending spaced glass fiber yarns disposed parallel to the edges of the tape and positioned on one surface of said paper, and a film of polyethylene fusion-bonded directly to said yarns and to the surface of said paper between said yarns, and a water-insoluble normally tacky and pressure-sensitive adhesive of the rubber-resin type on the other surface of said paper.

3. A tape as set forth in claim 2 wherein the number of said yarns per inch of width of said tape is equal to from 10 to 70.

No references cited.